(12) United States Patent
Gokturk

(10) Patent No.: US 9,982,581 B1
(45) Date of Patent: *May 29, 2018

(54) REDUCTION OF POLLUTANTS FROM A COMBUSTION ENGINE

(71) Applicant: Halit Gokturk, San Francisco, CA (US)

(72) Inventor: Halit Gokturk, San Francisco, CA (US)

(*) Notice: Subject to any disclaimer, the term of this patent is extended or adjusted under 35 U.S.C. 154(b) by 251 days.

This patent is subject to a terminal disclaimer.

(21) Appl. No.: 14/821,772

(22) Filed: Aug. 9, 2015

Related U.S. Application Data

(63) Continuation of application No. 13/452,923, filed on Apr. 22, 2012, now abandoned.

(51) Int. Cl.
| | |
|---|---|
| *B03C 1/00* | (2006.01) |
| *F01N 3/00* | (2006.01) |
| *B03C 1/005* | (2006.01) |
| *B03C 3/01* | (2006.01) |
| *F01N 3/01* | (2006.01) |
| *F01N 3/08* | (2006.01) |
| *B01D 53/94* | (2006.01) |

(52) U.S. Cl.
CPC ............... *F01N 3/00* (2013.01); *B01D 53/94* (2013.01); *B03C 1/005* (2013.01); *B03C 3/01* (2013.01); *F01N 3/01* (2013.01); *F01N 3/0892* (2013.01); *B01D 2255/802* (2013.01); *B03C 2201/16* (2013.01); *B03C 2201/30* (2013.01)

(58) Field of Classification Search
CPC ........... B03C 1/025; B03C 1/005; B03C 3/41; B03C 3/47; B03C 2201/16; B03C 2201/30; B01D 53/323; B01D 53/94; B01D 2258/0283; B01D 2259/814; F01N 3/00; F01N 3/01; F01N 3/0892
USPC ....................... 60/275; 95/28, 57; 204/157.3; 422/186.04, 186.3; 96/15, 16, 3
See application file for complete search history.

*Primary Examiner* — Kelsey Stanek

(57) ABSTRACT

Burning of hydrocarbon fuels in a combustion engine creates pollutants that include carbon monoxide, nitrogen oxides, and various hydrocarbons. Catalytic converter which is designed to reduce such pollutants relies on precious metal catalysts like platinum. There is an ongoing need to find more effective methods of pollution control as well as cheaper alternatives to precious metals. The solution proposed in this disclosure takes advantage of electrical characteristics of exhaust gases. Some of the pollutants in the exhaust gas exhibit positive electron affinity. Such pollutants are converted to negative ions by providing extra electrons. Many of the pollutants have charge distributions which facilitate electrical interactions with the ions. They are attracted to the ions to form clusters. Pollutant clusters formed as such are separated from the rest of the exhaust gas by electric and/or magnetic forces.

20 Claims, 8 Drawing Sheets

REDUCTION OF POLLUTANTS FROM A COMBUSTION ENGINE

This application claims the benefit of U.S. Nonprovisional application Ser. No. 13/452,923, filed on Apr. 22, 2012.

TECHNICAL FIELD

This disclosure relates generally to the reduction of pollutants which are generated during the combustion of hydrocarbon fuels such as gasoline, diesel, natural gas and alcohol in a combustion engine. Burning of such fuels creates pollutants that include carbon monoxide (CO), nitrogen oxides (NOx), various hydrocarbons like benzene ($C_6H_6$), and particulate matter (PM) [Ref. 1]. Pollutants can be generated also due to evaporation from the fuel source before combustion.

Utilization of hydrocarbon fuels also generates carbon dioxide ($CO_2$) which is not a regulated pollutant. There is growing scientific evidence that $CO_2$ accumulation in the atmosphere is impacting the climate through global warming [Ref. 2]. Therefore reduction of greenhouse gases like $CO_2$ is another objective of this disclosure.

Emissions from the combustion engine are referred to as exhaust gas in the disclosure.

BACKGROUND ART

Environmental regulations restrict emissions of pollutants such as carbon monoxide, nitrogen oxides, hydrocarbons and particulate matter from combustion engines. Generally the exhaust gas is passed through a device called catalytic converter to reduce the pollutants [Ref. 3]. The catalytic converter is designed to have a large surface area coated with catalytic materials such as platinum which act on the pollutants. The catalytic converter performs several functions:

1. Reduction of carbon monoxide (CO): Carbon monoxide which is a poisonous gas, occurs due to partially burned carbon in a hydrocarbon fuel. Although there is plenty of oxygen to react with in air, CO in the exhaust gas does not readily oxidize into carbon dioxide ($CO_2$). Catalytic materials help convert CO to $CO_2$.

$$2CO + O_2 \rightarrow 2CO_2 \qquad \text{Eq. 1}$$

2. Reduction of nitrogen oxides: Nitrogen gas which exist in the ambient atmosphere about 78% by volume is a relatively inert gas. However at high temperatures and pressures generated in a combustion chamber, some of it gets oxidized to form NO and $NO_2$, which is generally referred to as NOx. NOx can create health and environmental problems. Catalytic materials help break down NOx gases back to nitrogen and oxygen.

$$2NO \rightarrow N_2 + O_2 \qquad \text{Eq. 2}$$

$$2NO_2 \rightarrow N_2 + 2O_2 \qquad \text{Eq. 3}$$

3. Reduction of hydrocarbons: Hydrocarbons are those molecules of the fuel which go through the combustion chamber either unburned or only partially burned. Typical examples are benzene ($C_6H_6$), butadiene ($C_4H_6$), acetaldehyde ($CH_3CHO$), acrolein ($H_2C=CHCHO$), and formaldehyde (HCHO) [Ref. 4]. Most are classified as carcinogens and they can create environmental problems like ozone or smog, as well. Catalytic materials break down the hydrocarbons so that they can react with the oxygen in the atmosphere to form water and carbon dioxide. For example in the case of formaldehyde:

$$HCHO + O_2 \rightarrow CO_2 + H_2O \qquad \text{Eq. 4}$$

Reduction of particulate matter: PM refers to soot particles which consist of hydrocarbons, sulfates and metallic residues that originate from the fuel and engine lubricant. Catalytic converter is not very effective at treating such clusters. PM is typically reduced by means of a filter installed at the exhaust.

SUMMARY OF INVENTION

Technical Problem

As the world economy grows and expands, the need for transportation, which relies heavily on the combustion engine increases. For example trucking, aviation, marine transportation and personal vehicles in the Asia Pacific region are expected to double by 2030 and 400 million more vehicles will be added by then [Ref. 5].

The catalytic converter has been improved over time to reduce the pollutants in the exhaust gas by more than 90%. Yet the transportation sector is responsible for a significant fraction of the pollutants because of the large number of vehicles on the road. For example in the US, more than 50% of the NOx emissions (about 5 million tons per year) originate from transportation [Ref. 6]. Hence there is an ongoing need to find more effective methods of reducing pollutants from the combustion engine and improvements are being introduced continually. For example US Patent Application 20100221164, by Lee, et al describes a method of introducing ozone and ammonia into the exhaust gas stream after the catalytic converter in order to reduce the nitrogen oxides further. Such chemicals need to be managed carefully since they are considered hazardous to human health and the environment.

Catalytic converter plays an essential role in reducing the pollutants, but it requires expensive and finite resources of precious metals such as platinum, palladium and rhodium. Due to increasing demand, these metals have seen their prices rise significantly over the past decade; for example the price of platinum increased to about $1800 per ounce as of April 2011. There are efforts to reduce the precious metal content of the catalyst by substituting platinum with cheaper alternatives. For example U.S. Pat. No. 7,381,683 by Wang, et al, describes a method of making multicomponent catalysts where platinum is partially replaced with palladium, silver and copper. Although those alternatives are cheaper than platinum, they still include scarce and expensive materials. It is highly desirable to eliminate such metals from the cleaning process.

In addition to the well known pollutants like nitrogen oxides, scientific understanding of global warming is giving rise to a need to restrict new exhaust gases such as carbon dioxide. The catalytic converter does not treat $CO_2$; on the contrary it increases the amount of $CO_2$ emitted during the cleaning process, as can be seen from equations 1 and 4. It is necessary to develop new methods which can cope with potential new pollutants like the greenhouse gases.

Solution to Problem

The solution proposed in this disclosure takes advantage of electrical characteristics such as electron affinity (eA) and dipole moment (Dm). Some of the pollutants, such as nitrogen dioxide (NO2), exhibit positive eA (eA>0). Such a pollutant can be easily converted to a negative ion by providing an extra electron. Many of the pollutants have dipolar charge distributions which facilitate electrical interactions with charges. If one of the pollutants becomes charged, it can attract other pollutants to form clusters of pollutants. Furthermore, charged clusters are responsive to electric and magnetic fields. For example, they can be separated from the rest of the exhaust gas by manipulating with such fields.

Figures 1A, 1B, 1C, 1D, 1E:
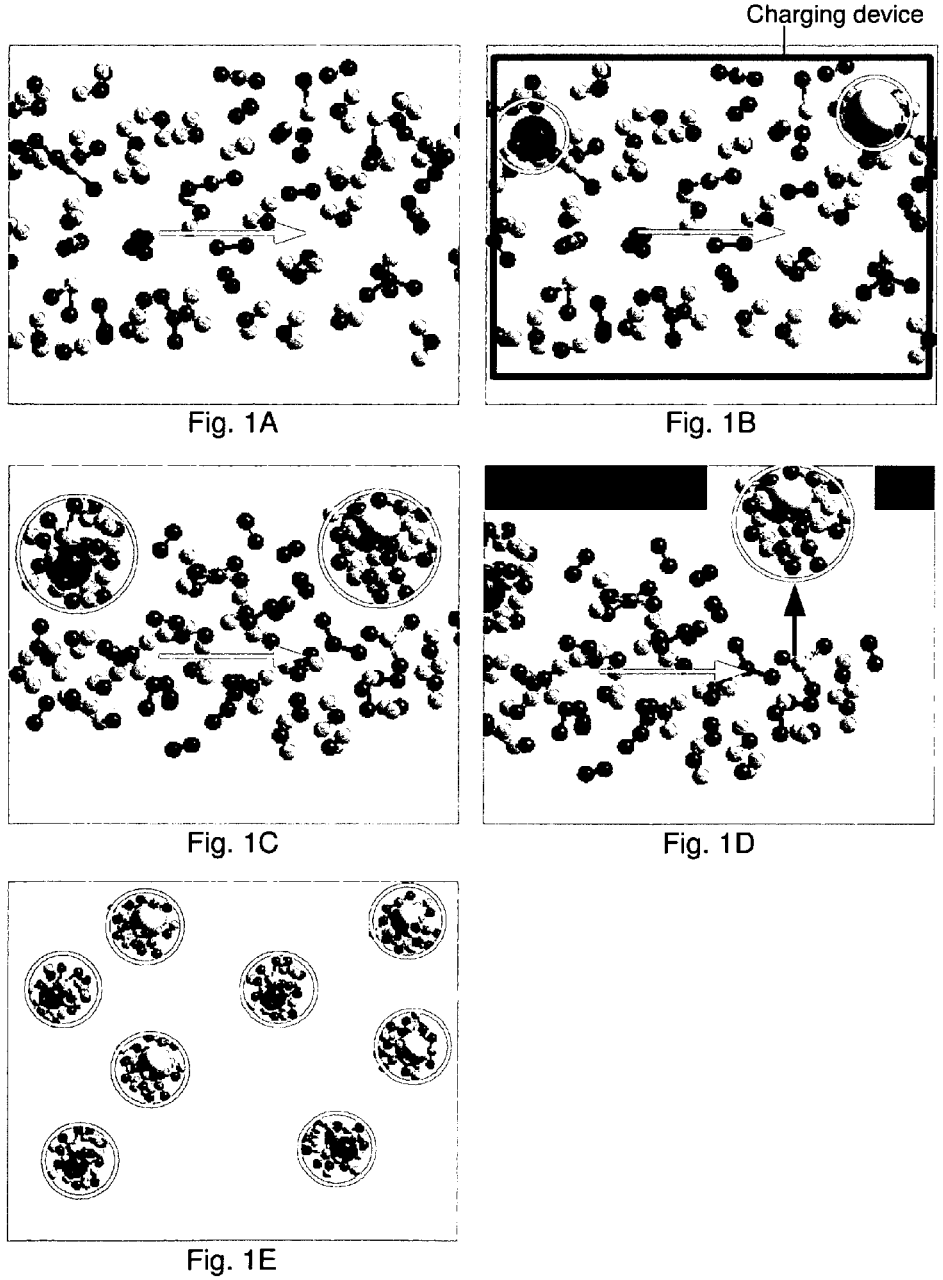
FIG. 1A. An exhaust gas stream containing pollutants flows in the direction of the arrow.
FIG. 1B. Some of the pollutants which have positive electron affinity get charged by a device which provides electrons to the exhaust gas.
FIG. 1C. Other pollutants cluster around the charged molecules.
FIG. 1D. Charged clusters are separated from the rest of the exhaust gas by electric/magnetic fields.
FIG. 1E. Molecules within the clusters undergo reactions with each other or by other chemicals introduced into the process.

An overview of the method is illustrated in FIG. 1. What is proposed is a multi-pollutant reduction method which involves:

1) Providing electrons to those pollutant molecules which can accept extra electrons by virtue of having a positive electron affinity (FIG. 1B), 2) Allowing the charged pollutants to float through the exhaust gas without losing the charged state (FIG. 1B-C), 3) Letting the charged pollutants electrically attract other pollutants in the exhaust gas to form charged clusters (FIG. 1C), 4) Separating these clusters from the rest of the exhaust gas by manipulating them with electric and/or magnetic fields (FIG. 1D), 5) Neutralizing the pollutants via reactions with other molecules which exist in the clusters or with new molecules introduced into the process (FIG. 1E).

Electrons which contribute to charging of the pollutants can be created using a number of different approaches including electrical breakdown of neutral molecules, thermionic emission from a metal, optical excitation of a photocathode or photocatalyst, triboelectrical charging by friction, and the like.

ADVANTAGEOUS EFFECTS OF INVENTION

1) Removing multiple pollutants with one charged pollutant: The proposed method is self amplifying where one charged pollutant can attract and capture other pollutants in the exhaust gas. Each pollutant does not have to have a positive eA and does not have to be individually charged.

2) Creating stable scavengers which have long lifetimes: Molecules which have positive eA become relatively stable when they acquire extra electrons. They can maintain the charged state for an extended period of time provided they do not encounter, for example, a metal surface which can dissipate the charge. Long lifetime is advantageous to scavenge more of the pollutants in the exhaust gas.

3) Absence of precious metals: The disclosed method utilizes pollutant molecules in the exhaust gas to perform the cleaning function. Cleaning process does not require any precious metal catalyts.

4) Removal of carbon dioxide: As will be described in the subsequent sections, the disclosed method is applicable not only to traditional pollutants like nitrogen dioxide, but also greenhouse gases like carbon dioxide.

DESCRIPTION OF EMBODIMENTS

Electron affinity (eA) is defined as the energy required to detach an electron from a singly charged negative ion [Ref. 7]. Alternative definition is the energy released when an electron is attached to a neutral atom or molecule. Expressed mathematically:

$$eA = (\text{Energy of neutral state}) - (\text{Energy of negative ion}) \quad \text{Eq. 5}$$

Generally an unbonded neutral atom with empty shells can accommodate an additional electron and the atom becomes more stable as it acquires it. An example would be a hydrogen atom which can complete its lowest shell with the extra electron. Energy of the negative ion of hydrogen is lower than that of the neutral atom and eA is positive (~73 kJ/mol). Positive eA indicates that the atom is receptive to the addition of an extra electron.

In the case of molecules, they are generally formed so as to attain greater stability when atoms constituting a molecule share their electrons. Therefore most molecules have low energies in the neutral state as compared to the negative ion state. eA of molecules are generally negative.

There are some exceptions where a molecule can exhibit affinity for an extra electron. Two of the regulated pollutants, nitrogen dioxide (NO2) and acrolein (H2C=CHCHO) serve as examples of molecules which have positive eA.

Determination of Electron Affinity eA of common molecules such as oxygen gas (O2) are well known, but not all of the eA values are readily available. Therefore eA of the molecules of interest were determined using first principle quantum mechanical calculations. The software used for the calculations is PQS version 3.3 from Parallel Quantum Solutions, Fayetteville Ark. (www.pqs-chem.com). Calculations were performed using the following method and basis sets:

Method: Density Functional Theory, B3LYP hybrid functional

Basis sets: Pople type split-valence (6-31G) basis with polarization and diffuse functions To calculate eA of a molecule two energy calculations need to be performed, one as a neutral molecule and the second as a negative ion as indicated in Eq. 1. eA of typical gases available in the ambient atmosphere are given in Table 1.

TABLE 1

Electron affinity (eA) of atmospheric gases

| | |
|---|---|
| Oxygen molecule (O2) | eA = +0.6 eV |
| Nitrogen molecule (N2) | eA = −1.5 eV |
| Carbon dioxide (CO2) | eA = −0.9 eV |
| Water molecule (H2O) | eA = −0.7 eV |

Water, carbon dioxide and nitrogen molecules have negative eA, whereas oxygen molecule has positive eA indicating that it is receptive to the addition of an extra electron.

TABLE 2

Electron affinity (eA) of exhaust gases

| | |
|---|---|
| Carbon monoxide (CO) | eA = −1.1 eV |
| Nitrogen monoxide (NO) | eA = −0.9 eV |
| Nitrogen dioxide (NO2) | eA = +2.3 eV |
| Benzene (C6H6) | eA = −1.8 eV |
| Butadiene (C4H6) | eA = −0.6 eV |
| Acetaldehyde (CH3CHO) | eA = −0.8 eV |
| Acrolein (H2C=CHCHO) | eA = +0.3 eV |
| Formaldehyde (HCHO) | eA = −0.6 eV | eA of typical pollutant molecules which can be found in the exhaust of an combustion engine are given in Table 2. Nitrogen dioxide and acrolein have positive eA, indicating they would be good candidates to utilize as ions.

Particulate matter (PM) refers to clusters of mineral matter and unburned fuel that are entrained in the exhaust gas. eA of such a cluster cannot be calculated without knowing composition and structure. However electrostatic precipitation method is known to be effective in reducing PM from power plants which burn coal [Ref. 8]. When an electrical discharge is created in the exhaust gas, some of the particles become negatively charged due to electrons sticking to the surface. These particles are collected by large surface area electrodes of opposite charge. Electrostatic precipitators can collect particles at efficiencies exceeding 90%. The ability to collect small particles with the help of an electrical discharge at such efficiency indicates that most of the PM are receptive to the free electrons generated during the discharge.

As can be seen from the above results, some of the pollutants of concern exhibit positive eA. By providing electrons to these pollutants, one can turn them into negative ions which can then scavenge other pollutants in the exhaust, including those which might not have positive eA.

It should be noted that oxygen molecule (O2) which is not a pollutant exists in the exhaust gas in varying amounts. It has the potential to acquire a free electron and serve as a charged scavenger. Although the presence of O2 is not necessary for the disclosed method, O2 can contribute to the reduction of pollutants if it becomes charged.

Charge Distribution and Electronic Moment of Gas Molecules

Electrons of a molecule distribute themselves around the nuclei of atoms based on quantum mechanical principles. Distribution of electrons can be calculated using quantum mechanical methods and software mentioned above.

Electron distribution of a molecule consisting of identical atoms like nitrogen (N2) or oxygen (O2) is the same around each atom. Whereas electron distribution of a molecule consisting of different atoms like the water molecule (H2O) depend on the atom. For example nucleus of the oxygen atom attracts more of the electrons of a molecule, hence oxygen atom becomes negative and hydrogen atoms become positive. Quantum mechanical calculations of H2O give the following atomic charges expressed in terms of the charge of an electron, qe (qe~1.610e-19 coulomb):

TABLE 3

Atomic charges of H2O

| | |
|---|---|
| Oxygen | −0.78 qe |
| Hydrogen | 0.39 qe |
| Hydrogen | 0.39 qe |

Electronic moments such as dipole moment (Dm) or quadrupole moment (Qm) of a molecule can be calculated from the charge distribution. Dm is a vector with three components. Qm is a 3*3 tensor with 9 components. Magnitude of Dm calculated for the molecules under consideration are given in Table 4. Dm is expressed in terms of debye which is ~3.3*10e-30 coulomb-meter.

N2 and O2 which constitute about 99% of the atmosphere have zero dipole moments and nearly zero quadrupole moments. On the other hand many of the pollutant molecules like CO, NO have dipolar charge distributions. One can take advantage of this difference when trying to separate the pollutants from N2 or O2. Generally electrical interaction between a charge and a dipole is stronger than that between a charge and a quadrupole. Some of the target molecules like CO2 and benzene have zero dipole moments. Effectiveness of the disclosed method on reducing such molecules will be explained further in subsequent sections.

TABLE 4

Dipole moment (Dm) of various molecules of interest

| | |
|---|---|
| Nitrogen molecule (N2) | Dm = 0 debye |
| Oxygen molecule (O2) | Dm = 0 debye |
| Water molecule (H2O) | Dm = 2.19 debye |
| Carbon monoxide (CO) | Dm = 0.03 debye |
| Carbon dioxide (CO2) | Dm = 0 debye |
| Nitrogen monoxide (NO) | Dm = 0.09 debye |
| Nitrogen dioxide (NO2) | Dm = 0.36 debye |
| Benzene (C6H6) | Dm = 0 debye |
| Butadiene (C4H6) | Dm = 0 debye |
| Acetaldehyde (CH3CHO) | Dm = 2.86 debye |
| Acrolein (H2C=CHCHO) | Dm = 3.51 debye |
| Formaldehyde (HCHO) | Dm = 2.50 debye |

Electrical Interactions Between Gas Molecules

This section is concerned with electrical interactions between molecules of interest either in neutral or charged state. These interactions do not include chemical reactions where composition of interacting molecules might change. Reactions will be taken up in a later section.

In order to quantify the strength of the electrical interaction between molecules, interaction energy between pairs of molecules has been calculated using the quantum mechanical methods and the software mentioned above. This calculation involves finding the optimal geometry of two chosen molecules which minimizes total energy. The software searches for optimal positioning of the atoms and the molecules with respect to each other. After finding the optimal geometry, one would calculate the energy at zero interaction, that is when the molecules are infinitely apart. In practice the energy at zero interaction is the sum of the energies of the molecules calculated alone. Interaction energy (IE) is given by:

IE=(Energy at zero interaction)−(Energy at optimal geometry)     Eq.6

Thermal energy of hot gas molecules as they exit the combustion chamber is assumed to be about 0.05 eV, which corresponds to an exhaust gas temperature of about 300 degree C. If the thermal energy is comparable to IE, electrical interaction would not be effective. IE has to be much greater than thermal energy in order for two molecules to attract each other.

Interaction of Pollutants with NO2

It is desirable that once one of the pollutants is charged it can strongly interact with other pollutants. NO2 is a good candidate to become a scavenger since it has a positive electron affinity and it is likely to be produced during the combustion of hydrocarbon fuels in air which is rich in nitrogen. In the case of neutral molecules the interaction is a) dipole versus dipole interaction, for example NO2 versus CO, or b) dipole versus quadrupole interaction, for example NO2 versus C6H6. In the case when NO2 is charged with an extra electron to become a negative ion, the interaction is a) charge versus dipole interaction, for example NO2-ion versus CO, or b) charge versus quadrupole interaction, for example NO2-ion versus C6H6.

IE of NO2 versus the dipolar pollutant molecules are given in Table 5. Results indicate that, energy of interactions between neutral molecules are weak as compared to the thermal energy of the exhaust gas. Charging NO2 with an extra electron increases the interaction energy and IE becomes significantly (about 3.5 to 10 times) greater than thermal energy. One can conclude from these results that a charged pollutant like NO2 can attract and capture other dipolar pollutant molecules in its vicinity.

TABLE 5

Energy of interaction (IE) between NO2 and dipolar pollutants

| | |
|---|---|
| CO vs NO2 | IE < 0.05 eV |
| CO vs NO2-ion | IE ~ 0.18 eV |
| NO vs NO2 | IE < 0.05 eV |
| NO vs NO2-ion | IE ~ 0.34 eV |
| Formaldehyde (HCHO) vs NO2 | IE < 0.05 eV |
| Formaldehyde vs NO2-ion | IE ~ 0.52 eV |
| Acetaldehyde (CH3CHO) vs NO2 | IE < 0.05 eV |
| Acetaldehyde vs NO2-ion | IE ~ 0.57 eV |

IE of NO2 versus quadrupolar pollutant molecules are given in Table 6. Results indicate that, energy of interactions between neutral molecules are weak as compared to the thermal energy of the exhaust gas. Charging NO2 with an extra electron increases the interaction energy and IE becomes 7-8 times greater than the thermal energy. Hence a charged pollutant like NO2 can attract other quadrupolar pollutants in its vicinity, including CO2.

TABLE 6

Energy of interaction (IE) between NO2 and quadrupolar pollutants

| | |
|---|---|
| CO2 vs NO2 | IE < 0.05 eV |
| CO2 vs NO2-ion | IE ~ 0.40 eV |
| Benzene (C6H6) vs NO2 | IE < 0.05 eV |
| Benzene vs NO2-ion | IE ~ 0.35 eV |
| Butadiene (C4H6) vs NO2 | IE < 0.05 eV |
| Butadiene vs NO2-ion | IE ~ 0.35 eV |

Interaction of Nitrogen Molecule with NO2

Nitrogen molecule (N2) is the most abundant gas in the atmosphere at about 78% by volume. When combustion of a hydrocarbon fuel takes place in air, oxygen (O2) molecules get consumed during the burning process, but N2 does not. Therefore it remains as the most abundant gas in the exhaust of the combustion. Since N2 is not a pollutant, interaction of N2 with a charge should be weak to distinguish it from pollutants. Results given in Table 7 indicate that IE of N2 versus charged NO2 is comparable to the thermal energy (~0.05 eV). N2 would not be able to cluster with charged molecules, since its IE is too small to overcome the thermal agitations.

TABLE 7

Energy of interaction (IE) between nitrogen molecule (N2) and NO2

| | |
|---|---|
| N2 vs NO2 | IE < 0.05 eV |
| N2 vs NO2-ion | IE ~ 0.06 eV |

Interaction of Water Molecule (H2O) with NO2

Water exists in the atmosphere in varying amounts up to a maximum of about 5% by volume. Combustion of hydrocarbon fuels increases the water content. For example when benzene burns, hydrogens bonded to benzene dissociate and combine with oxygen to form water.

Water has a sizeable dipole moment of about 2 debye. It can interact with charged or uncharged molecules in the exhaust gas. Results given in Table 8 indicate that IE of H2O versus neutral NO2 molecules is comparable to or less than the thermal energy of the exhaust gas. IE of H2O versus charged NO2 molecules is more than an order of magnitude greater than the thermal energy. Although water is not a pollutant, it would be attracted to charged molecules in the same way as the dipolar pollutants.

TABLE 8

Energy of interaction (IE) between water molecule (H2O) and NO2

| | |
|---|---|
| H2O vs NO2 | IE < 0.05 eV |
| H2O vs NO2-ion | IE ~ 0.8 eV |

Formation of Oxyacids within Clusters

One of the phenomena associated with NOx pollution is known to be acid rain where pollutant molecules released into the atmosphere interact with water molecules to form oxyacids, such as nitric acid (HNO3). The cleaning method given in this disclosure utilizes charged molecules to form clusters of NOx, CO2, and other pollutants together with water. These clusters have the potential to facilitate oxyacid formation since they concentrate the reactants and bring them in close proximity. Typically acidification reactions occur as follows:

CO2+H2O→H2CO3     Eq.7

3NO2+H2O→NO+2HNO3     Eq.8

2NO2+H2O→HNO2+HNO3     Eq.9

NO+NO2+H2O→2HNO2     Eq. 10

The inclusion of water molecules into clusters of pollutants might seem detrimental to the cleaning process since water is not a pollutant, but water helps convert the gaseous pollutants into liquid oxyacids which can then be neutralized by reacting with a suitable base. Two examples of acid-base reactions which use calcium hydroxide, Ca(OH)2, as a base are as follows:

$$H2CO3+Ca(OH)2 \rightarrow 2H2O+CaCO3 \qquad \text{Eq.11}$$

$$2HNO3+Ca(OH)2 \rightarrow 2H2O+Ca(NO3)2 \qquad \text{Eq.12}$$

Calcium compounds, such as calcium carbonate (CaCO3), obtained as a result of the neutralization reactions are beneficial products which can be utilized in various industries.

Charging Methods

Electrons which contribute to charging of the pollutants can be created using a number of different approaches including electrical breakdown of neutral molecules, thermionic emission from a metal, optical excitation of a photocathode or photocatalyst, triboelectrical charging by friction, and the like. Charging methods which utilize unused energy such as excess heat generated during combustion or renewable energy such as solar radiation are preferable in order not to reduce the efficiency of the engine.

Charging Example 1. Thermionic Charging

Basic principle of thermionic emission is the escape of electrons from a metal surface heated to a high enough temperature that energy of some of the electrons exceeds the work function of the metal. Typical operating temperatures are about 600-1000 degree C. which is within the range of temperatures obtained during the combustion of fuels. Thermionic emission is a mature technology widely used, for example, in cathode ray tubes or fluorescent lamps.

Figure 2A:
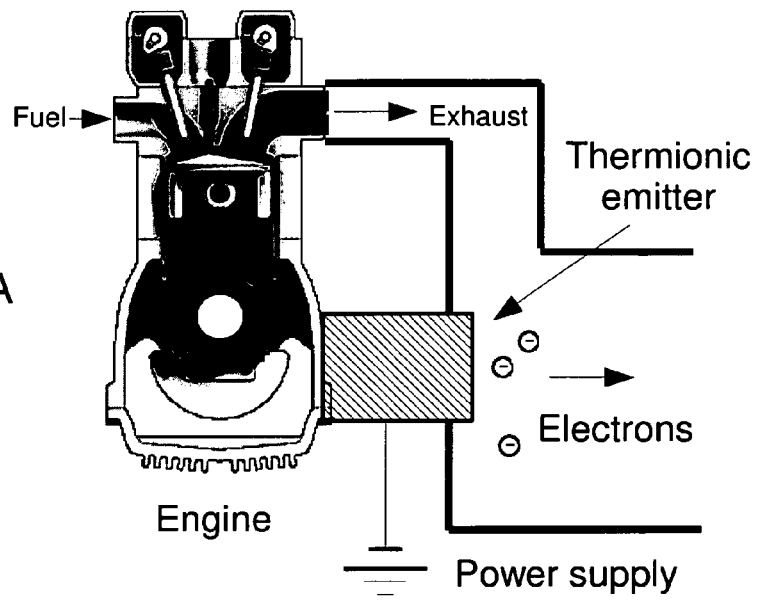
FIG. 2A. Schematic drawing of a thermionic charging unit where the electron emitter is placed in thermal contact with a hot section of the combustion chamber.

The thermionic charging unit (FIG. 2A) consists of an electron emitting metal placed in good thermal contact with a hot section of the combustion chamber. Tungsten is the preferred metal for the emitter because it can withstand high temperatures. Tungsten has a work function of about 4.5 eV which is somewhat large for thermionic emission. It is coated with a mixture of the oxides of strontium (SrO), barium (BaO), and calcium (CaO) in order to reduce the work function. The emitter is connected to a power supply in order to replenish the electrons which are lost in the thermionic process. The combustion chamber and the exhaust gas conduit are electrically insulated from the emitter.

Figure 2B:
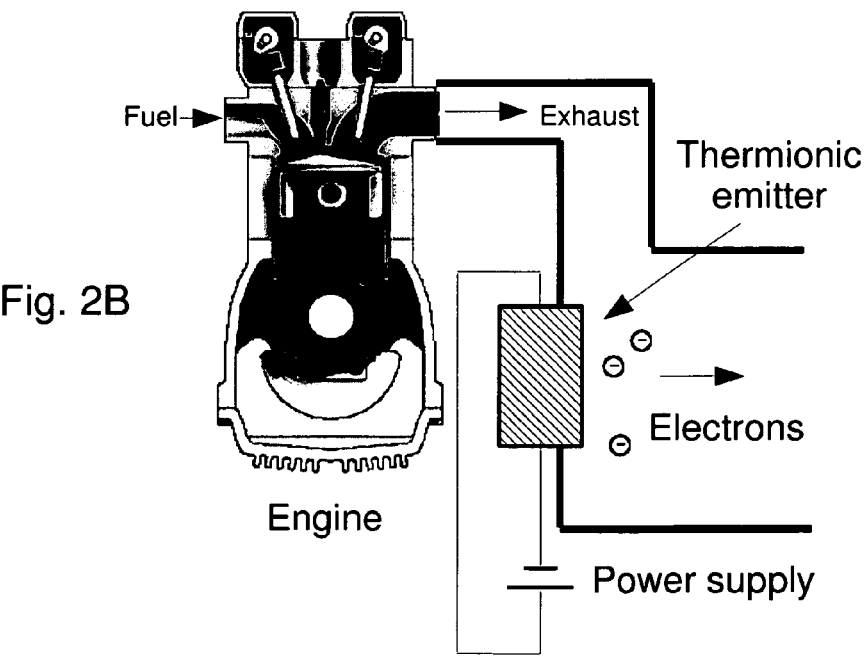
FIG. 2B. Schematic drawing of a thermionic charging unit where the electron emitter is heated by the external power supply.

An alternative implementation would be to connect the electron emitting metal as a resistor and heat it to the desired operating temperature using the power supply as shown in FIG. 2B. Such an approach is implemented, for example, in fluorescent lamps.

Charging Example 2. Photocatalytic Charging

Photocatalysts are a special class of materials which are optically activated to perform catalytic functions. They are widely used in applications such as self cleaning of building surfaces, anti-fogging of mirrors, bacteria reduction in medical facilities, and the like [Ref. 9].

A typical photocatalyst is titanium dioxide (TiO2) semiconductor which has an anatase type crystal structure. The material is available as a powder or dispersion which can be coated onto tiles, glass, etc. It is generally used as a thin coating of the order of 100 nm thickness. For example U.S. Pat. No. 6,387,844 by Fujishima, et al describes a method of coating TiO2 onto window glass in order to impart photocatalytic functionality to windows.

Anatase TiO2 has a bandgap of ~3.2 eV. It can be excited by near UV (~390 nm) wavelengths which are available in the spectrum of sunlight. Absorption of a photon of energy equal to or greater than the bandgap generates electrons and holes. TiO2 has the capability to donate the electrons excited to the conduction band to molecules on the surface. For example oxygen molecule (O2) which is abundant in the atmosphere and which has a positive electron affinity receives an electron to become O2-ion. If the photocatalyst is exposed to not ambient air but the exhaust gas, excited electrons can be donated to other molecules which have positive eA, such as NO2.

The excited TiO2 also has the capability to withdraw electrons from other molecules to satisfy the hole in the valence band. Typically it withdraws an electron from a water molecule on the surface which releases the hydroxyl (OH) of water. OH is a well known scavenger of pollutants in air. For example it can react with nitrogen dioxide to form nitric acid.

$$OH+NO2 \rightarrow HNO3 \qquad \text{Eq. 13}$$

Hence, the photocatalyst can contribute to the reduction of pollutants not only by charging pollutant molecules but also by creating hydroxyl molecules as well.

Figure 3A:
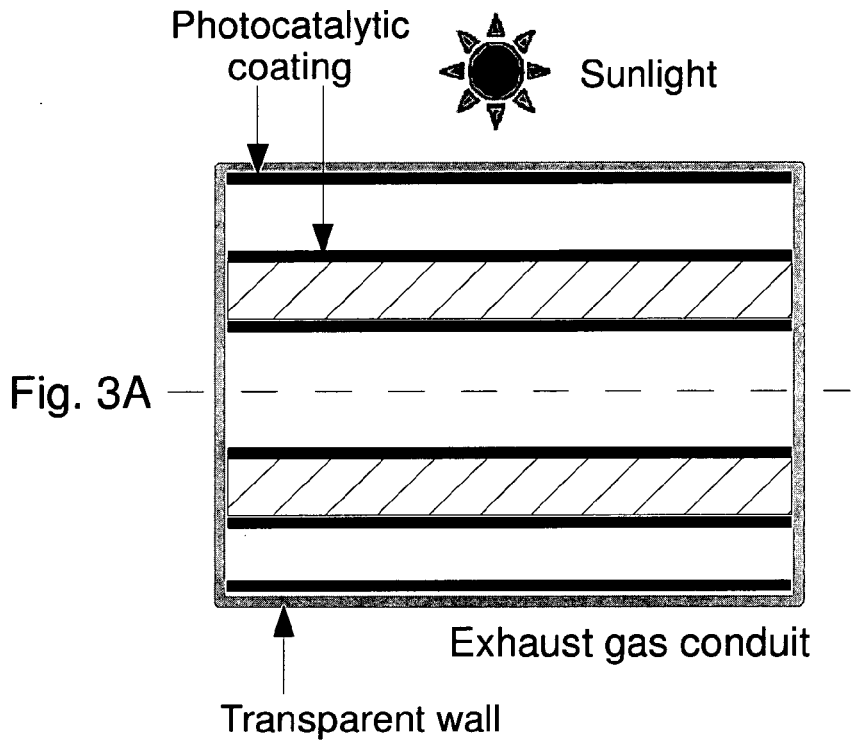
FIG. 3A. Cross-sectional view of a photocatalytic charging unit along the axial direction.
Figure 3B:
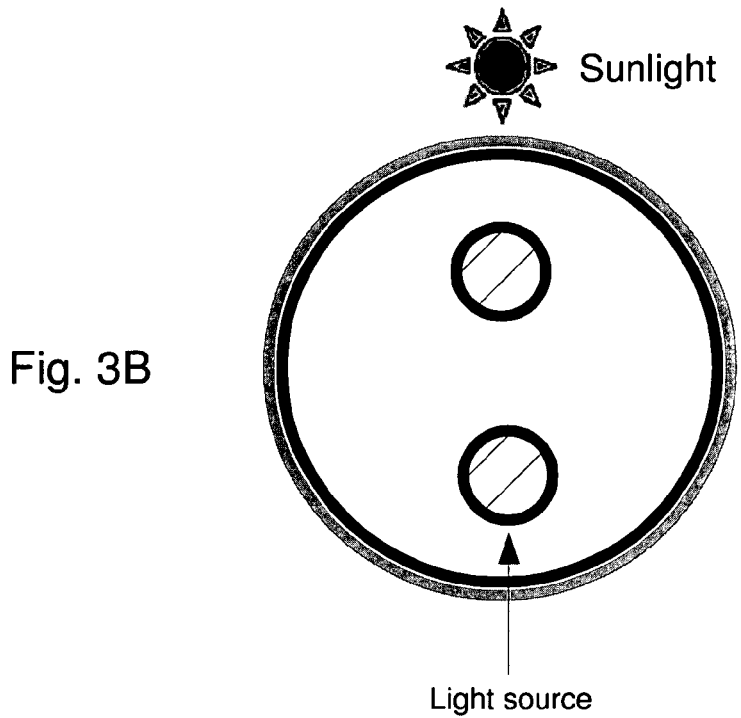
FIG. 3B. Cross-sectional view of the same along the radial direction.

Photocatalytic charging unit (FIG. 3) consists of a photocatalyst coated surface in contact with the exhaust gas. A transparent section of the gas conduit allows sunlight to be incident on the photocatalyst. Optionally, a secondary light source which provides optical radiation when sunlight is not adequate or available can be installed. The secondary light source can be chosen as a fluorescent lamp without any phosphor coating to utilize ultraviolet emissions of the lamp. Glass envelope of the secondary light source can be coated with a photocatalyst to make maximum use of the optical radiation generated by the lamp.

Methods of Manipulating Charged Clusters

Once a pollutant molecule in the exhaust gas is charged by acquiring an electron, it needs to be treated with care so that the charge is not lost by accident. As the charged pollutant floats through the exhaust gas it attracts pollutants and grows into a cluster. Charge on the seed molecule holds the cluster together. If the charge is lost somehow, the cluster can dissociate by thermal energy and pollutants can scatter back into the exhaust gas.

If the charged molecule or cluster comes in contact with a grounded metal surface, such as the walls of the gas conduit it would lose its charge. Therefore the charged molecule or cluster needs to be kept away from such surfaces as it floats in the exhaust gas.

One can apply an electric or magnetic field in order to manipulate the motion of a charge, q. Forces generated by electric and magnetic fields are expressed with the Lorentz equation:

$$\text{Force vector} = q(\text{Electric field}) + q(\text{velocity vector})\char`\^(\text{Magnetic field}) \qquad \text{Eq. 14}$$

where ^ stands for vector multiplication. Accordingly, an electric field of magnitude E would apply a force of magnitude qE in the direction of the field. A magnetic field would apply a force to a moving charge in a direction perpendicular to both the magnetic field and the direction of motion. For example a charge moving along the z-axis with a velocity of v, through a magnetic field B along the y-axis would feel a force of magnitude qvB along the x-axis.

Electric Field Example 1: Electrified Conduit

The function of the electrified conduit is to keep the charged clusters away from the outer wall which has a substantial surface area. It is assumed that the clusters are moving through the conduit in the axial direction along with the rest of the exhaust gas and velocity in the radial direction is small and random.

Figure 4A:
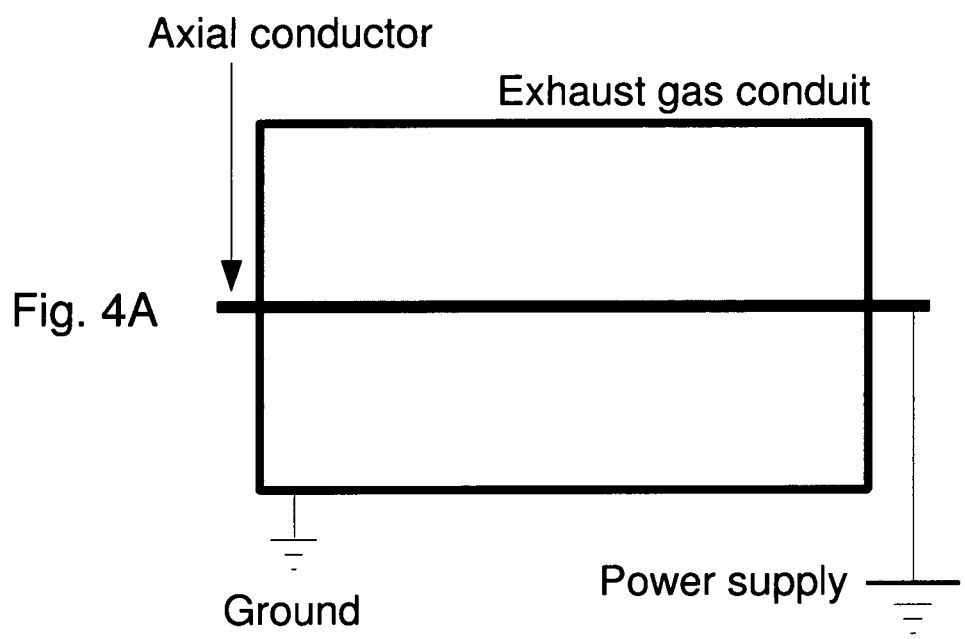
FIG. 4A. Cross-sectional view of an electrified conduit along the axial direction.
Figure 4B:
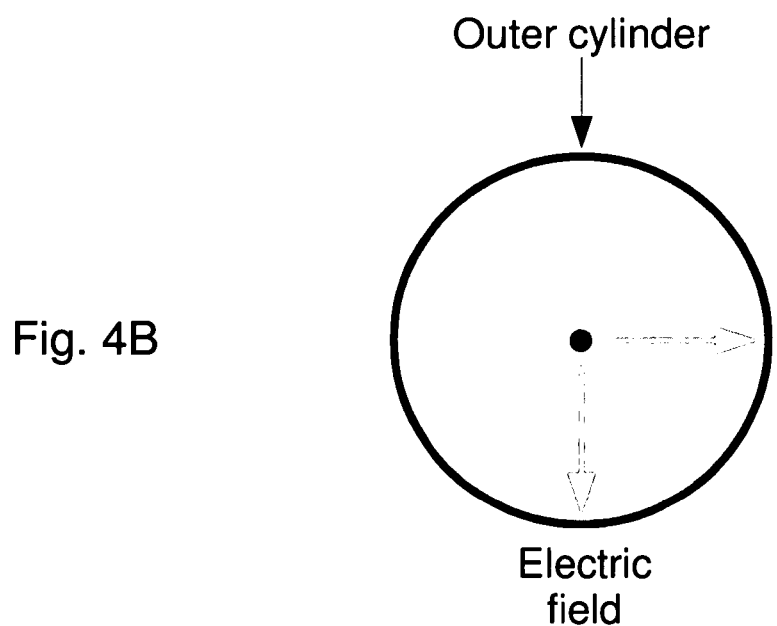
FIG. 4B. Cross-sectional view of the same along the radial direction.

A radial electric field is set up by applying a voltage between a conductor on the axis of the cylinder and a metallic outer cylinder as shown in FIG. 4. Electric force acting on the negatively charged clusters must be approximately radial pointing towards the axis of the conduit. Connecting the axial conductor to positive voltage and the outer cylinder to ground provides the desired electric field. Surface area of the axial conductor needs to be minimized to decrease the chances of charged molecules coming in contact with it. Therefore the diameter of the axial wire must be as small as practical.

Electric Field Example 2: Charge-Metal Interactions

Figure 5:
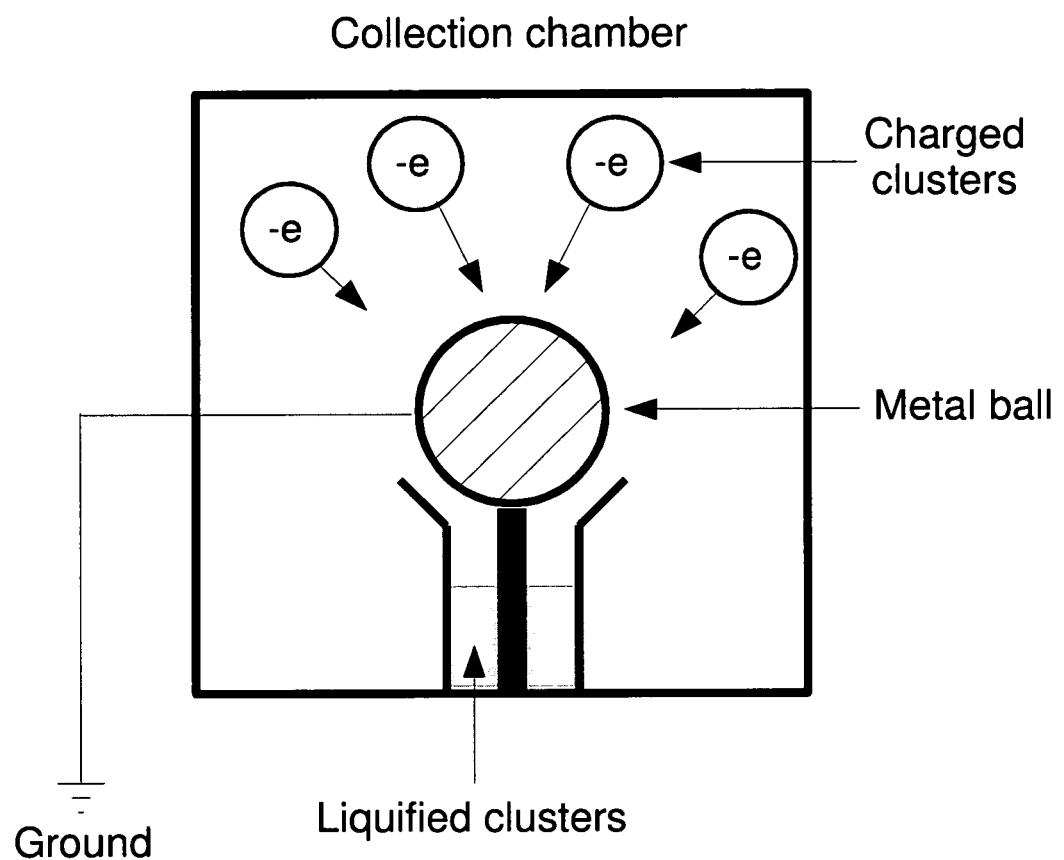
FIG. 5. An example of a charge metal-interaction where charged clusters floating inside the collection chamber are precipitated by a metal ball.

When a charged molecule is brought to the vicinity of a metal, the charges in the metal rearrange themselves to create a net zero electric field inside the metal. The electrical attraction between the original charge and those induced on the metal create an electric force which pulls the charge towards the metal without applying any external field. As an example this phenomena can be used to collect charged clusters which include the pollutants. The arrangement is given in FIG. 5. A metallic ball made of a metal with an inert surface, such as chrome, is placed at the center of a collection chamber where clusters are guided into. The ball is electrically grounded to dissipate any charge it might receive from the clusters. A charged cluster in the proximity of the ball experiences an electric force due to the metal-charge interaction. The cluster moves towards the ball and eventually touches it loosing its charge. The cluster condenses on the metal and then flows into the collection container placed underneath.

Magnetic Field Example: Magnetic Separation Unit

The function of the unit is to separate pollutant clusters from the rest of the exhaust gas.

It is assumed that charged clusters are moving parallel to the axis (z-axis) of the conduit along with the rest of the exhaust gas at an average velocity of vz and velocity along the x and y axes (vx & vy) are small and random.

Figure 6A:
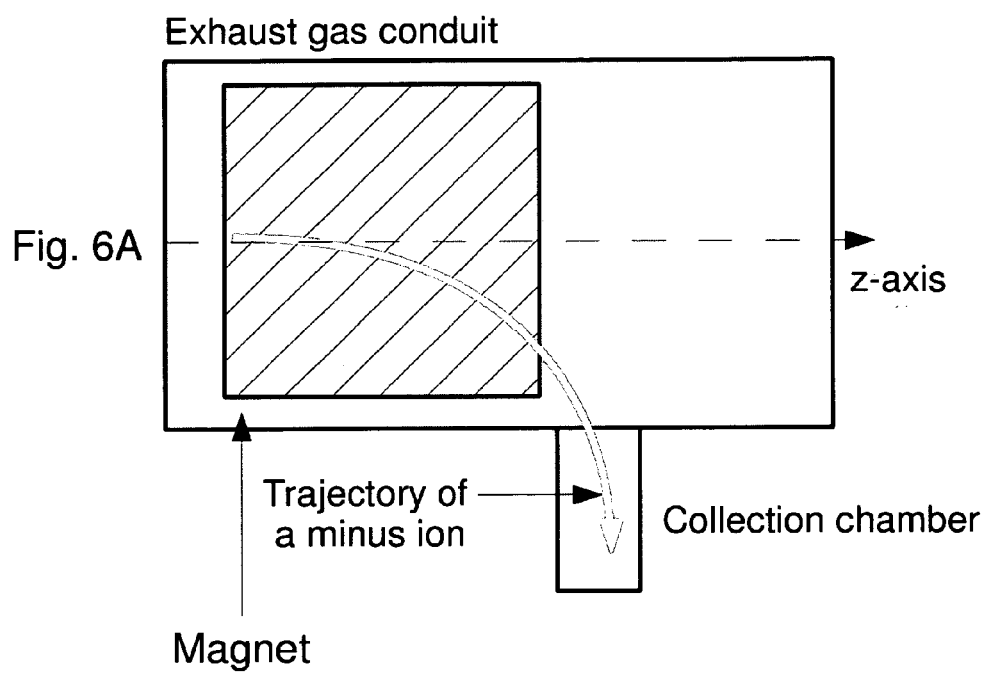
FIG. 6A. Cross-sectional view of a magnetic separation unit along the xz-plane.
Figure 6B:
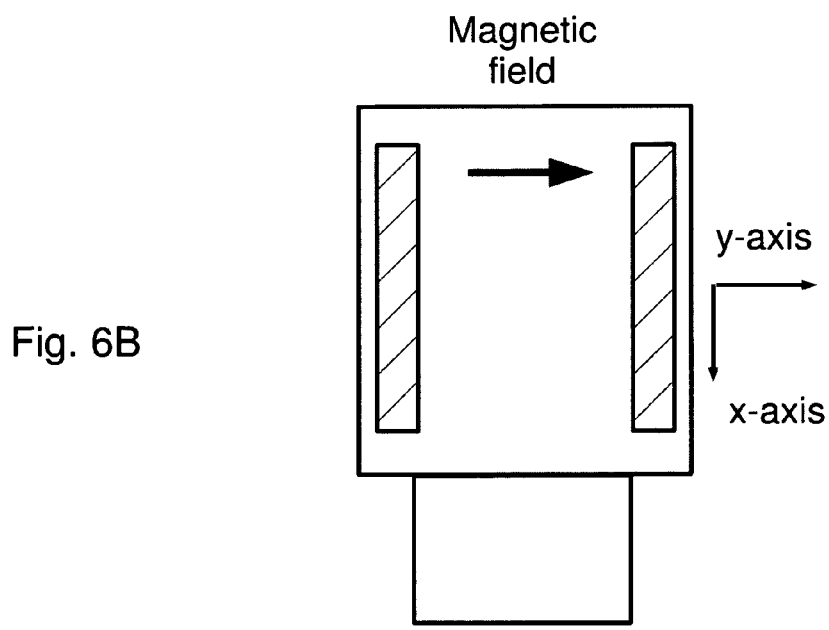
FIG. 6B. Cross-sectional view of the same along the xy-plane.

A magnetic field is applied along the y-axis, using for example permanent magnets as shown in FIG. 6, so that the charged cluster feels a net force along the x-axis. Velocity of the cluster changes from vz only to vz and vx. The cluster follows an arc in the xz plane heading towards the wall of the conduit. By providing an opening at the wall, charged clusters can be separated from the rest of the flow and collected into a chamber where they can be further processed as explained above.

The force acting on the charged cluster along the x-axis can be increased by applying an electric field in the x direction in addition to the magnetic field. Separation can be accomplished by applying only an electric field, as described in examples 1 and 2, as well.

INDUSTRIAL APPLICABILITY

Primary industrial application intended for this disclosure is the internal combustion engine which is used mainly in transportation vehicles such as autos, motorcycles, buses, trucks, and naval vessels. Such engines are also used in applications not related to transportation, for example grass cutting machines or portable electricity generators.

Application Example 1. Internal Combustion Engine

Figure 7:
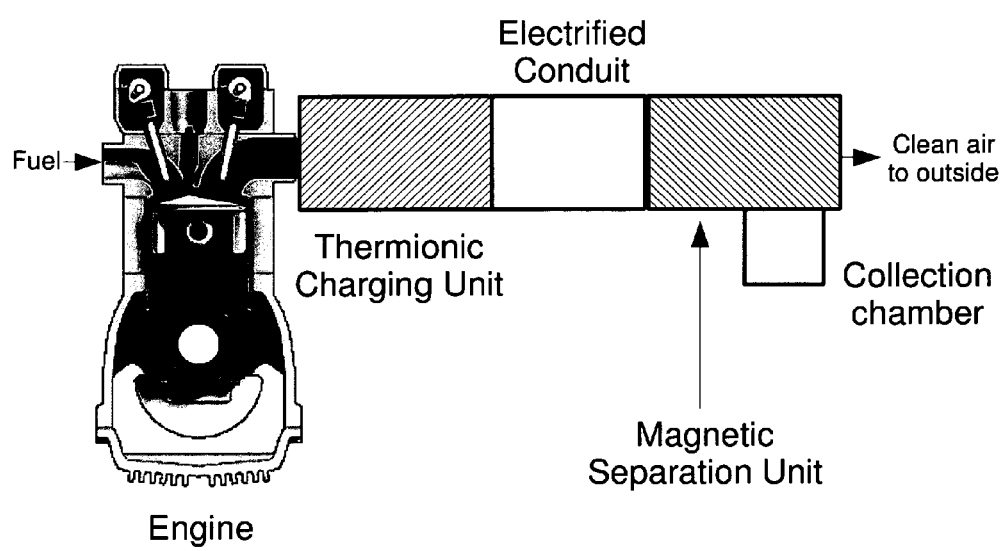
FIG. 7. Schematic layout of a first application example where pollutants generated by the combustion engine are reduced using the disclosed method and means.

Objective of this application is to reduce the pollutants and carbon dioxide in the exhaust of an internal combustion engine. The pollution reduction apparatus implementing the method described in this disclosure is placed between the combustion chamber of the engine and the outlet to air. The cleaning apparatus either supplements or completely replaces the catalytic converter. Building blocks of the application are schematically illustrated in FIG. 7.

1) A thermionic charging unit provides electrons to the exhaust gas which charges some of the pollutants that have positive electron affinity.

2) An electrified conduit conveys the exhaust gas containing the charged pollutants which attract other pollutants to form clusters.

3) Charged clusters are separated from the rest of the gas using a magnetic separation unit and collected into a chamber.

4) Clusters in the chamber are condensed as described above and periodically disposed.

Although thermionic charging has been chosen for this application, charging can be implemented by using photocatalytic charging or a combination of various charging methods.

Likewise magnetic separation has been chosen for this application, but separation can be implemented by using electric separation or a combination of separation methods.

Application Example 2. Air Purification

Figure 8:
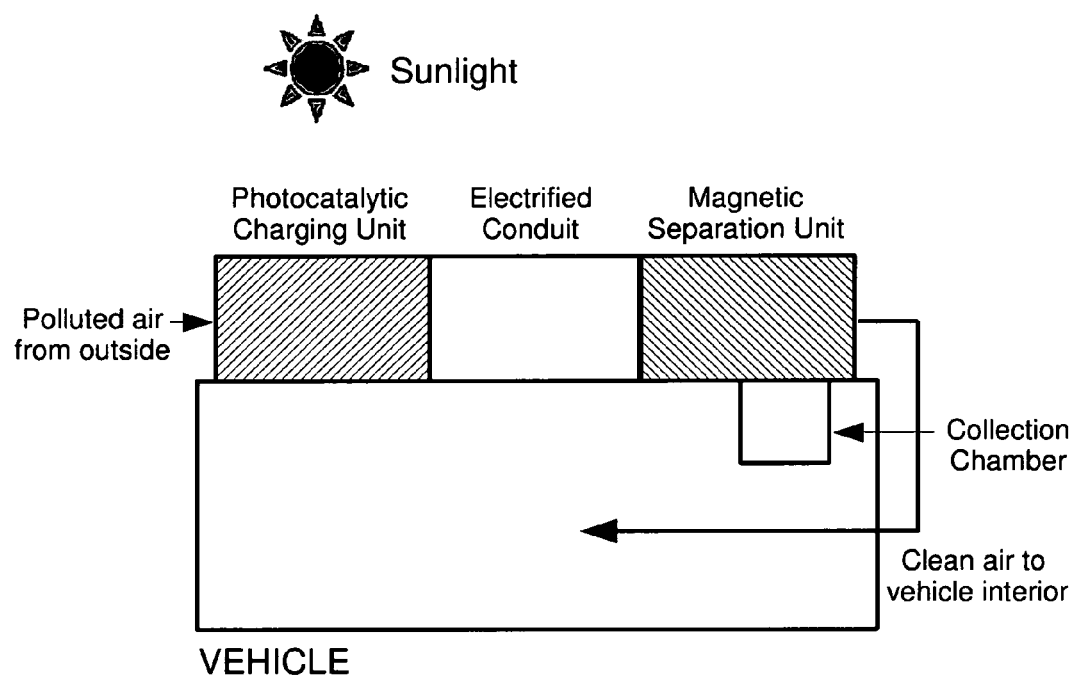
FIG. 8. Schematic layout of a second application example where dirty air containing the pollutants is purified by using the disclosed method and means.

Objective of this application is to purify the air which is polluted by a large number of combustion engines. Such pollution can accumulate for example in roadways with heavy traffic, partially enclosed road structures like tunnels or congested urban areas without adequate air circulation. It is assumed that outside air contains the pollutants which need to be reduced before air is circulated to human beings. Building blocks of an application where outside air is purified before being fed into a vehicle are schematically illustrated in FIG. 8.

1) A photocatalytic charging unit is placed on the roof of the vehicle or a location which is exposed to solar radiation. Polluted air is passed over the photocatalytic coating in order to charge some of the pollutants which have positive electron affinity.

2) An electrified conduit conveys the air containing the charged pollutants which attract other pollutants to form clusters.

3) Charged clusters are separated using a magnetic separation unit and are collected into a chamber.

4) Pollutants accumulating in the chamber are condensed as described above and periodically disposed.

Although photocatalytic charging has been chosen for this application to take advantage of solar radiation, charging can be implemented by using thermionic charging or a combination of various charging methods.

Likewise magnetic separation has been chosen for this application, but separation can be implemented by using electric separation or a combination of separation methods.

REFERENCE SIGNS LIST

Dm: Dipole moment
eA: Electron affinity
ESP: Electrostatic precipitator

IE: Interaction energy
PM: Particulate matter
qe: Charge of an electron
Qm: Quadrupole moment

CITATION LIST

Patent Literature

US Patent Application 20100221164, by Lee, et al, published on Sep. 2, 2010
Title: NOx Emission Control System for Hydrocarbon Fueled Power Source
U.S. Pat. No. 7,381,683 by Wang, et al, issued on Jun. 3, 2008
Title: Method of Producing Multi-Component Catalysts
U.S. Pat. No. 6,387,844 by Fujishima, et al, issued on May 14, 2002
Title: Titanium Dioxide Photocatalyst Non Patent Literature 1. "Pollutants," by Environmental Protection Agency
Available at: http://epa.gov/otaq/invntory/overview/pollutants/index.htm
2. "Climate Change," by Environmental Protection Agency
Available at: epa.gov/climatechange
3. "Technology for Emissions Control," by Association of Emission Control by Catalyst
Available at: www.aecc.eu
4. "Air Toxics from Motor Vehicles," by Environmental Protection Agency
Available at: http://www.epa.gov/otaq/f02004.pdf
5. "The Outlook for Energy," by ExxonMobil, 2010
Available at: exxonmobil.com/energyoutlook
6. "Benchmarking Air Emissions of the 100 Largest Electric Power Producers in the United States" by M. J. Bradley & Associates, 2010
Available at: http://www.ceres.org and http://www.nrdc.org.
7. International Union of Pure and Applied Chemistry Compendium of Chemical Terminology, 2nd Edition, 1997
Available at: http://www.iupac.org/goldbook/E01977.pdf
8. "Electrostatic Precipitation," Encyclopedia Britannica Online, 2010
Available at: www.search.eb.com/eb/article-9032345
9. "Discovery and Applications of Photocatalysis" by Japan Nanonet Bulletin, 44th Issue, May 2005
Available at: http: //www.nanonet.go.jp/english/mailmag/2005/044a.html

I claim:

1. A method of reducing pollutants in an exhaust gas,
where said exhaust gas is generated by a combustion engine, and
said pollutants are reduced by
providing electrons to exhaust gas molecules which have positive electron affinity to convert said molecules to negative ions, where said electrons have an average kinetic energy of less than 1 electron volt,
floating said ions through said exhaust gas without losing said electrons,
separating said ions and any pollutants attracted to said ions by applying an electric or a magnetic field or a combination thereof.

2. The method in claim 1 where said electrons are generated by thermionic emission.

3. The method in claim 1 where said electrons are generated by a photocatalyst which is excited by optical radiation.

4. The method in claim 1, where said exhaust gas contains pollutants generated during the combustion of hydrocarbon fuels, as well as unburned or partially burned molecules of said fuels.

5. The method in claim 1, where said combustion engine is a spark ignited engine.

6. The method in claim 1, where said combustion engine is a diesel engine.

7. An apparatus to reduce pollutants in an exhaust gas,
where said exhaust gas is generated by a combustion engine, and
said apparatus consists of:
a charging unit which provides electrons to gas molecules which have positive electron affinity to convert them to negative ions, where said electrons have an average kinetic energy of less than 1 electron volt,
a conduit which allows said ions to float through said exhaust gas to attract pollutant molecules,
a separation unit which applies an electric or magnetic field or a combination thereof to said exhaust gas to remove said ions and said pollutants attracted to said ions.

8. The apparatus in claim 7, where the said charging unit consists of a thermionic emitter connected to an electric power supply.

9. The apparatus in claim 7, where the said charging unit consists of an optically transparent wall inside of which is coated with a photocatalytic material.

10. The apparatus in claim 7, where the said charging unit includes one or more lamps which are coated with a photocatalytic material, and said lamps emit optical radiation of energy sufficient to excite said photocatalytic material.

11. The apparatus in claim 7, where the separation unit includes electric or magnetic field generating elements where said electric or magnetic fields apply on said ions a force in a direction different from the flow direction of said exhaust gas to separate the ions from said exhaust gas.

12. The apparatus in claim 7, where said conduit includes electric field generating elements which create an electric force that keeps said ions away from walls of said conduit.

13. The apparatus in claim 7 equipped with electrically grounded metal surfaces placed in the flow path of said ions to collect and condense said ions and said pollutants attracted to said ions.

14. An apparatus to purify polluted air
where said apparatus is installed in a transportation vehicle, and
consists of:
a charging unit which provides electrons to gas molecules in said polluted air which have positive electron affinity to convert them to negative ions, where said electrons have an average kinetic energy of less than 1 electron volt,
a conduit which allows said ions to float through said polluted air to attract pollutant molecules,
a separation unit which applies an electric or magnetic field or a combination thereof to said polluted air to remove said ions and said pollutants attracted to said ions.

15. The apparatus in claim 14, where the said charging unit consists of a thermionic emitter connected to a power supply.

16. The apparatus in claim 14, where the said charging unit consists of an optically transparent wall inside of which is coated with a photocatalytic material.

17. The apparatus in claim 14, where the said charging unit includes one or more lamps which are coated with a photocatalytic material, and said lamp(s) emit optical radiation of energy sufficient to excite said photocatalytic material.

18. The apparatus in claim 14, where the separation unit includes electric or magnetic field generating elements where said electric or magnetic fields apply on said ions a force in a direction different from the flow direction of said polluted air to separate the ions from the said polluted air.

19. The apparatus in claim 14, where said conduit includes electric field generating elements which create an electric force that keeps said ions away from walls of said conduit.

20. The apparatus in claim 14 equipped with electrically grounded metal surfaces placed in the flow path of said ions to collect and condense said ions and said pollutants attracted to said ions.

\* \* \* \* \*